C. M. Sexton,
Running Gear.
No. 81,217.
Patented Aug. 18, 1868.
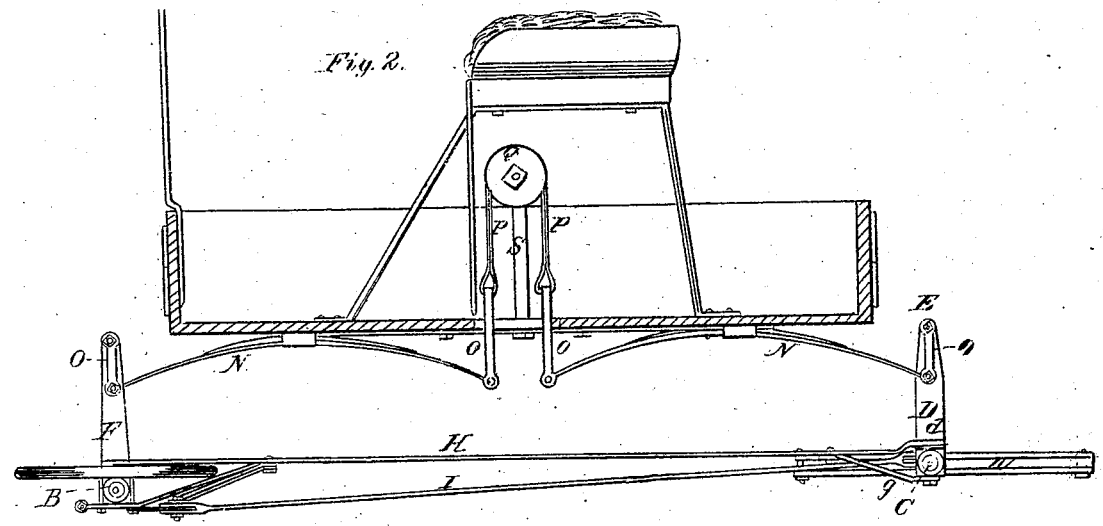
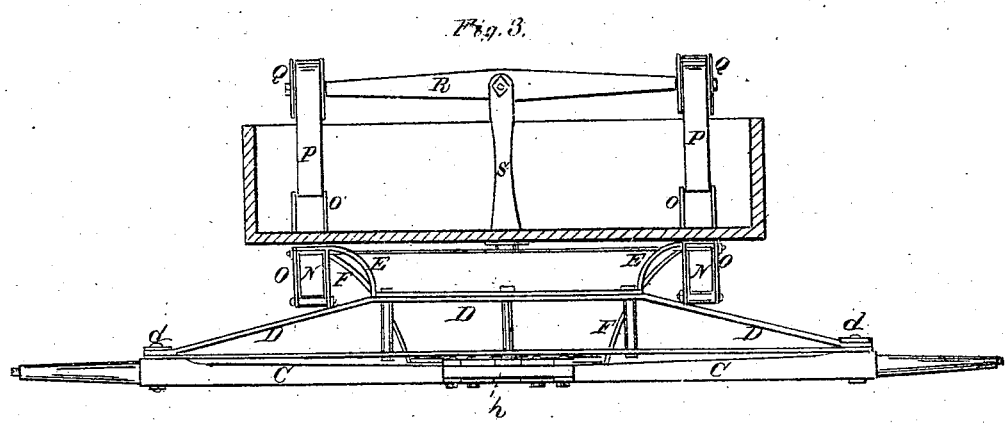

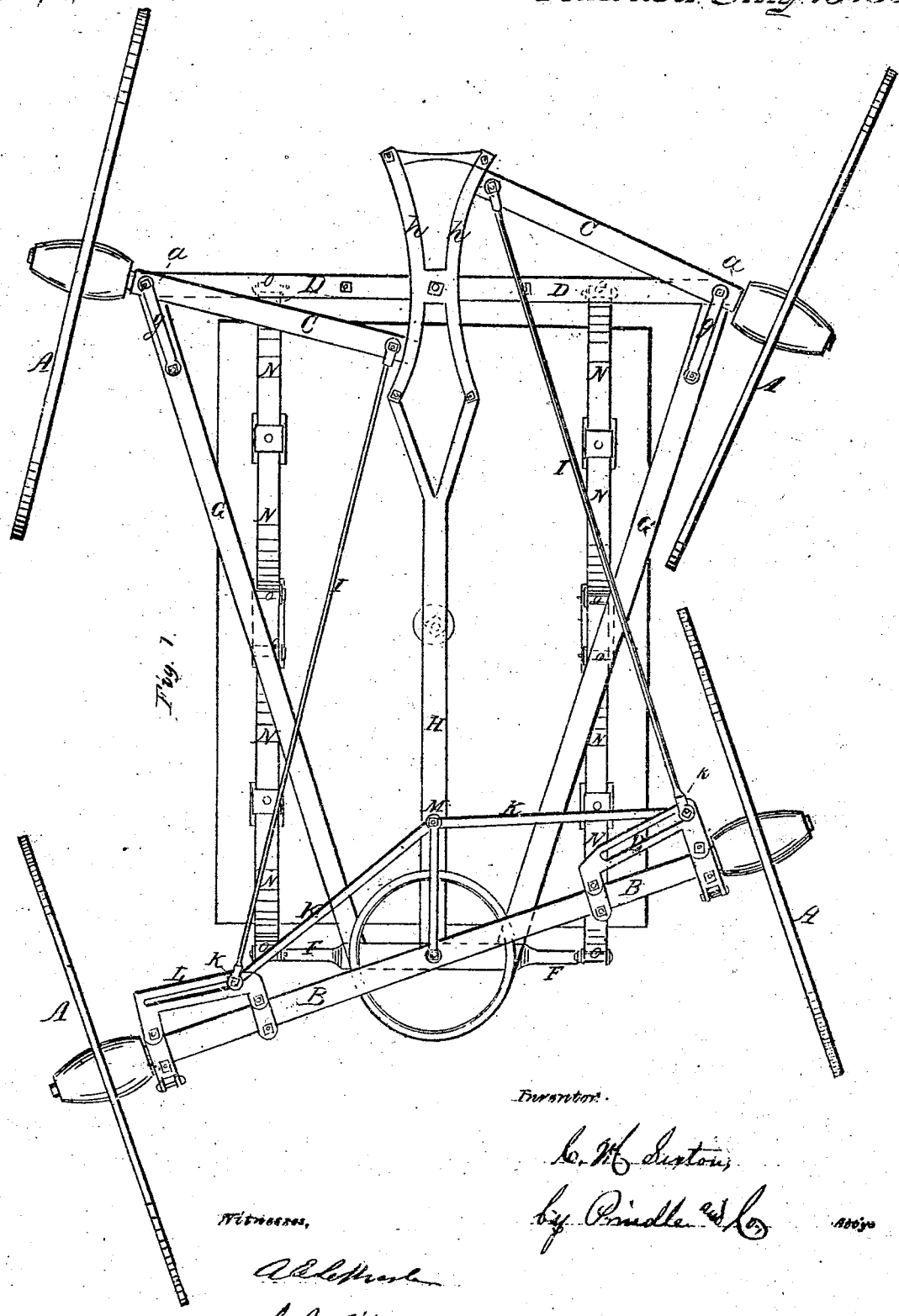

United States Patent Office.

C. M. SEXTON, OF AURORA, ILLINOIS.

Letters Patent No. 81,217, dated August 18, 1868.

IMPROVEMENT IN RUNNING-GEAR FOR WAGONS.

*The Schedule referred to in these Letters Patent and making part of the same.*

TO ALL WHOM IT MAY CONCERN:

Be it known that I, C. M. SEXTON, of Aurora, in the county of Kane, and in the State of Illinois, have invented an Improvement in Wagons; and do hereby declare that the following is a full, clear, and exact description thereof, reference being had to the accompanying drawings, making a part of this specification, in which—

Figure 1 is a plan of the bottom of the wagon.

Figure 2 is a side elevation, with the wheels and side of body removed.

Figure 3 is an end elevation, with the wheels and end of body removed.

My invention consists in an improved method of turning or cramping the rear, as well as front axle, and in a more perfect manner of suspending the body by springs, whereby the rocking and tilting experienced when ordinary springs are used are avoided, and ease and steadiness secured.

Letters of like name and kind refer to like parts in each of the figures.

In the accompanying drawings—

A represents the wheels, B the front, and C the rear axle.

D represents a trussed support, resting upon the rear axle C, upon the top of which is a saddle, E, to which the body is hung.

The support D is connected at its outer ends with the front saddle, F, by two flat bars or braces, G, and in the centre by the reach H.

The front axle, B, is connected with the running-gear in the usual manner, while the rear axle, C, is divided in the centre, and each half attached to the outer ends of the support D by a bolt, d, which passes through the brace G, support D, axle C, and a small brace, g, forming a joint upon which each half of the axle turns.

Upon the rear end of the reach H is a double guide, h, each side of which is an arc of a circle, of which the joint d is the centre, in which the inner ends of the axle slide.

Attached near the inner ends of the axle C are rods, I, the front ends of which are coupled to the braces K by a bolt, k, which passes through a slot in the plates L, attached to the outer ends of the front axle B, allowing the ends of the rods to move laterally. The braces K are connected with the reach H, at m, by a bolt, upon which they turn.

The operation of this running-gear is as follows, viz:

In describing a circle with the wagon, the front axle is turned or cramped in the usual manner, the inner end pushing back the corresponding half of the rear axle by the rods I, while the opposite end pulls forward the other half of the rear axle, the adjustment of the plates L and braces K being such that lines radiating from the centre of the circle would pass through the centre lengthwise of the front axle and each half of the rear axle, so that the face of each wheel is at all times at a right angle to a line passing through the centre of the circle being described.

The rear wheels describe the same circle as the front wheels, so that the former will pass anything that the latter will clear, and enables this wagon to turn in less space than is required by others.

H represents half-elliptic springs, two upon each side, fastened to the body-frame by bolts through the centre of each, the outside ends of which are suspended from the saddles by hangers, O, while the inner ends are suspended by like hangers, o, to opposite ends of a strap, P, which passes over a pulley, Q, attached to the end of an equalizer, R.

S represents a support, secured to the body, at its lower end, by a bolt passing through the bottom, while upon its upper end is a clevis-joint, in which the centre of the equalizer R rests.

The equalizer is placed under the seat, where it is entirely out of the way.

This manner of suspending the body gives the greatest ease and comfort possible, as the shock received by one of the wheels is, by means of the straps, pulleys, and equalizer, distributed equally to each spring, so that the body retains a level position, regardless of the inequalities of the road, while the hangers allow sufficient end-motion to obviate the slight interruptions to a uniform rate of speed occasioned by passing over stones or other obstructions.

Having thus fully described the nature and merits of my improvement, what I claim as my invention, and desire to secure by Letters Patent, is—

The combination and arrangement of the divided axle C, double guide $h$, rods I, braces K, and slotted plates L, substantially as herein set forth.

I also claim the hangers O $o$, strap P, pulleys Q, equalizer R, and springs H, when constructed and used for the purpose substantially as herein specified.

In testimony that I claim the foregoing, I have hereunto set my hand, this sixth day of April, 1868.

C. M. SEXTON.

Witnesses:
   D. C. PRATT,
   A. MANN.